United States Patent [19]
Groff et al.

[11] Patent Number: 4,572,428
[45] Date of Patent: Feb. 25, 1986

[54] IN DUCT ATOMIZING HUMIDIFICATION AND EVAPORATIVE COOLING SYSTEM

[75] Inventors: Gordon S. Groff, Lancaster; Dean S. Herr, Willow Street, both of Pa.

[73] Assignee: Herrmidifier Company, Inc., Lancaster, Pa.

[21] Appl. No.: 689,766

[22] Filed: Jan. 8, 1985

[51] Int. Cl.³ .............................. B01F 3/02; F24F 3/14
[52] U.S. Cl. ................................. 236/44 A; 62/176.4; 165/20
[58] Field of Search ............. 236/44 A, 44 B; 165/20; 126/113; 62/171, 176.4

[56] References Cited

U.S. PATENT DOCUMENTS 4,323,191  4/1982  Chiyoda et al. .................. 236/44 A

FOREIGN PATENT DOCUMENTS 567031  3/1975  U.S.S.R. ............................ 236/44 A

*Primary Examiner*—William E. Wayner
*Attorney, Agent, or Firm*—Brady, O'Boyle & Gates

[57] ABSTRACT

An in duct humidification and evaporative cooling system for industrial and commerical buildings is disclosed. Air and water under pressure are utilized to atomize water into minute droplets which rapidly evaporate and raise the level of relative humidity while producing evaporative cooling. A first relative humidity sensor/transmitter produces a signal proportional to the relative humidity of return air, and a second relative humidity sensor/transmitter provides a signal proportional to the relative humidity of supply air. Preset receiver-controllers external to the duct receive the two signals and send them to a low signal selector which in turn sends the lower signal to a modulating water valve and to an electrical switch which opens a valve in the pressurized air supply line. A second electrical switch operatively connected in the air supply line opens a valve in the pressurized water supply line. Air and water from the two supply lines are delivered to in duct air and water manifolds and to spray heads on the air manifold to maintain automatically the required humidification and cooling parameters.

12 Claims, 3 Drawing Figures

IN DUCT ATOMIZING HUMIDIFICATION AND EVAPORATIVE COOLING SYSTEM

BACKGROUND OF THE INVENTION

Conventional atomizing duct air humidification systems are unsatisfactory for use in large commercial and industrial buildings, principally because of a rapid saturation of the air flowing in the ductwork, causing condensation and water build-up in the ductwork, which is obviously undesirable.

Consequently, the present invention has for its main objective to eliminate the above and other deficiencies of prior art humidification systems. More particularly, the invention seeks to provide an in duct system capable of not only supplying total humidification for a commercial or industrial building but also controlled evaporative cooling which will greatly reduce mechanical cooling costs during the transition seasons and completely eliminate the problem of condensation and water build-up inside of the air ductwork.

Other important attributes of the system in accordance with the present invention include automatic fully modulating controls that allow the atomizing spray head system located within and across the air duct to operate from zero pounds of water per hour to full output required to humidify and cool commercial and industrial buildings having existing ductwork.

Should an electrical power failure occur, the system shuts off automatically. Automatic system shut off also occurs in the event of air compressor failure.

If the water supply fails, the spray heads will discharge air only. If the water supply pressure is lost or reduced, the spray heads will sputter without harm to the system. The spray heads operate drip-free and are self-cleaning and self-purging at the end of every "on" cycle. The system is designed for "on" and "off" operation, without which the cleaning and purging action is lost. The system can be started and stopped merely by operating an on-off switch provided on the control cabinet.

Other features and advantages of the invention will become apparent during the course of the following description.

DETAILED DESCRIPTION

Figure 1:
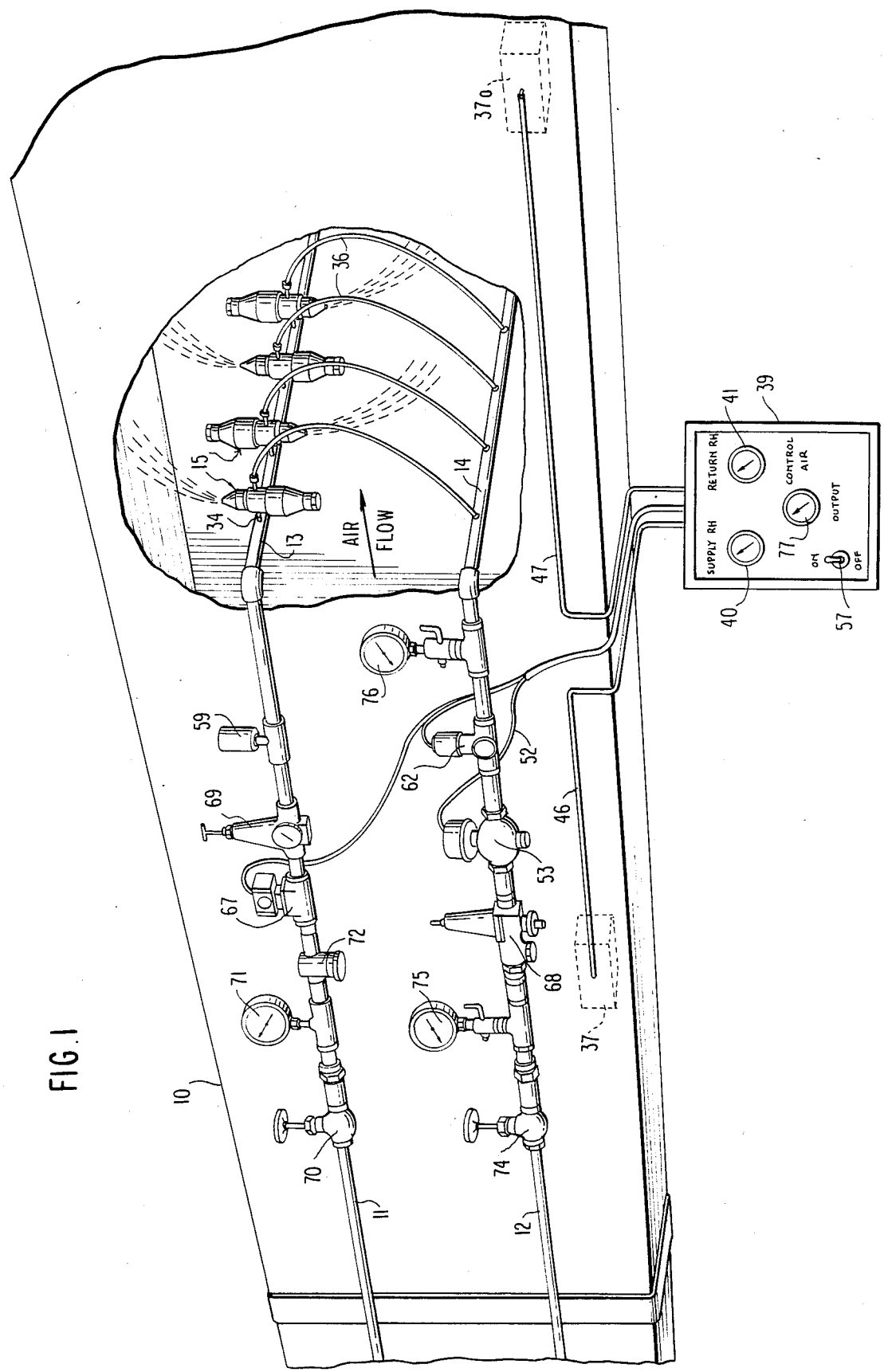
FIG. 1 is a fragmentary perspective view, partly broken away, of an in duct humidification and evaporative cooling system according to the invention.

Referring to the drawings in detail wherein like numerals designate like parts, FIG. 1 depicts the physical arrangement of the system according to the invention with relation to a main air supply duct 10 of a commercial or industrial building. A system pressurized air supply line 11 external to the duct 10 and extending along one side wall thereof supplies system air typically at 45 psi. Similarly, a system water supply line 12 also external to the duct 10 and extending along the same side wall thereof supplies system water typically at 45 psi. The air and water supply lines 11 and 12, which are in parallel spaced relationship, deliver air and water, respectively, in the operational cycle of the system to an air manifold 13 and a parallel water manifold 14 disposed within the main air duct 10 and extending transversely across its air flow axis, preferably at right angles thereto and at right angles to the external air and water supply lines 11 and 12.

Figure 2:
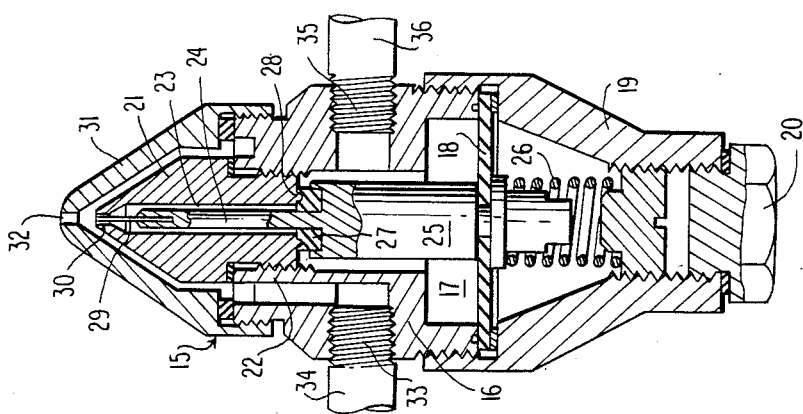
FIG. 2 is a central vertical section taken through one atomizing spray head of the system.

The air manifold 13 mounts a required number of atomizing spray heads 15, one of which is shown in detail in FIG. 2. The spray outlets of the heads 15 can be directed alternately upwardly and downwardly on the header 13, although in some cases all of the spray heads can have their outlets directed upwardly or all may have their outlets downwardly, depending upon the requirements of a particular installation of the system. In any case, a sufficient number of the spray heads 15 is provided on the manifold 13 to span the width of the duct 10 substantially so that humidifying and cooling sprays can be delivered into the duct substantially across its full width.

Referring to FIG. 2, each spray head 15 includes a body 16 having a chamber 17 spanned by an elastic diaphragm 18 held in place by a rear clamping head 19 having a threaded closure plug 20. A water nozzle element 21 has threaded engagement with an extension 22 of the body 16 and has a bore 23 receiving a stem 24 of a central plunger 25 urged forwardly by a spring arrangement 26 behind the diaphragm 18. The plunger 25 carries a seal 27 which engages an opposing seat 28 of the water nozzle element 21.

The stem 24 at its leading end carries a cleaning needle 29 which normally projects into the water outlet orifice 30 of nozzle element 21. An air nozzle tip 31 having an outlet orifice 32 for air and water surrounds the nozzle element 21 with the orifices 30 and 32 coaxially aligned. The air nozzle tip 31 is threadedly engaged with the body 16, as shown.

Each spray head 15 has a system air inlet port 33 opening through one side thereof and being threadedly connected to an air supply branch 34 of the air manifold 13. The air inlet port 33 communicates with the outlet orifice 32 by flowing through the annular space between nozzle element 21 and nozzle tip 31.

On its opposite side, each spray head 15 has a water inlet port 35 threadedly coupled to a water supply tube 36 having its opposite end similarly coupled to the water manifold 14.

When system water under pressure is delivered by one of the tubes 36 to the inlet port 35 of each spray head 15, this water acts on the diaphragm 18 and unseats the seal 27, allowing water to enter the bore 23 and discharge through the orifice 30. At the same time, pressurized system air from one of the branches 34 enters the port 33 and passes to and through the orifice 32 along with water exiting through the orifice 30. This results in a very fine atomization of water droplets entrained within air exiting through the orifice 32 of each spray head 15. The water droplets have an average size of approximately 7.5 microns. Such droplets rapidly evaporate to the gaseous state in the air duct 10 to raise the level of relative humidity therein, and provide evaporative cooling.

The spray head 15 per se is conventional and preferably is of the type disclosed in U.S. Pat. No. 2,825,602.

The system according to the invention includes, as very important elements located within the duct 10, a control humidity sensor/transmitter 37, preferably a humidity sensor/transmitter manufactured by Barber Coleman Company, Loves Park, Ill. No. HKS-2033, or an equivalent device; and a high limit humidity sensor/transmitter 37a of the identical type identified above. The control (return air) humidity sensor/transmitter 37 is placed in the duct 10 upstream of the two manifolds 13 and 14. The high limit (supply air) humidity sensor/transmitter 37a is placed in the duct 10 downstream from the manifolds 13 and 14 and immediately ahead of the first bend, obstruction or diffuser 38 in the duct 10.

A controls cabinet 39 mounted outside of the duct 10 contains two gages 40 and 41 which display, respectively, the control (return air) relative humidity and the high limit (supply air) relative humidity. These gages are identical and are manufactured by Barber Coleman Company as No. AKS-9081.

Also within the cabinet 39 are a control receiver/controller 42 and a high limit receiver/controller 42a, which are identical elements manufactured by Barber Coleman Company as No. RKS-1001.

Figure 3:
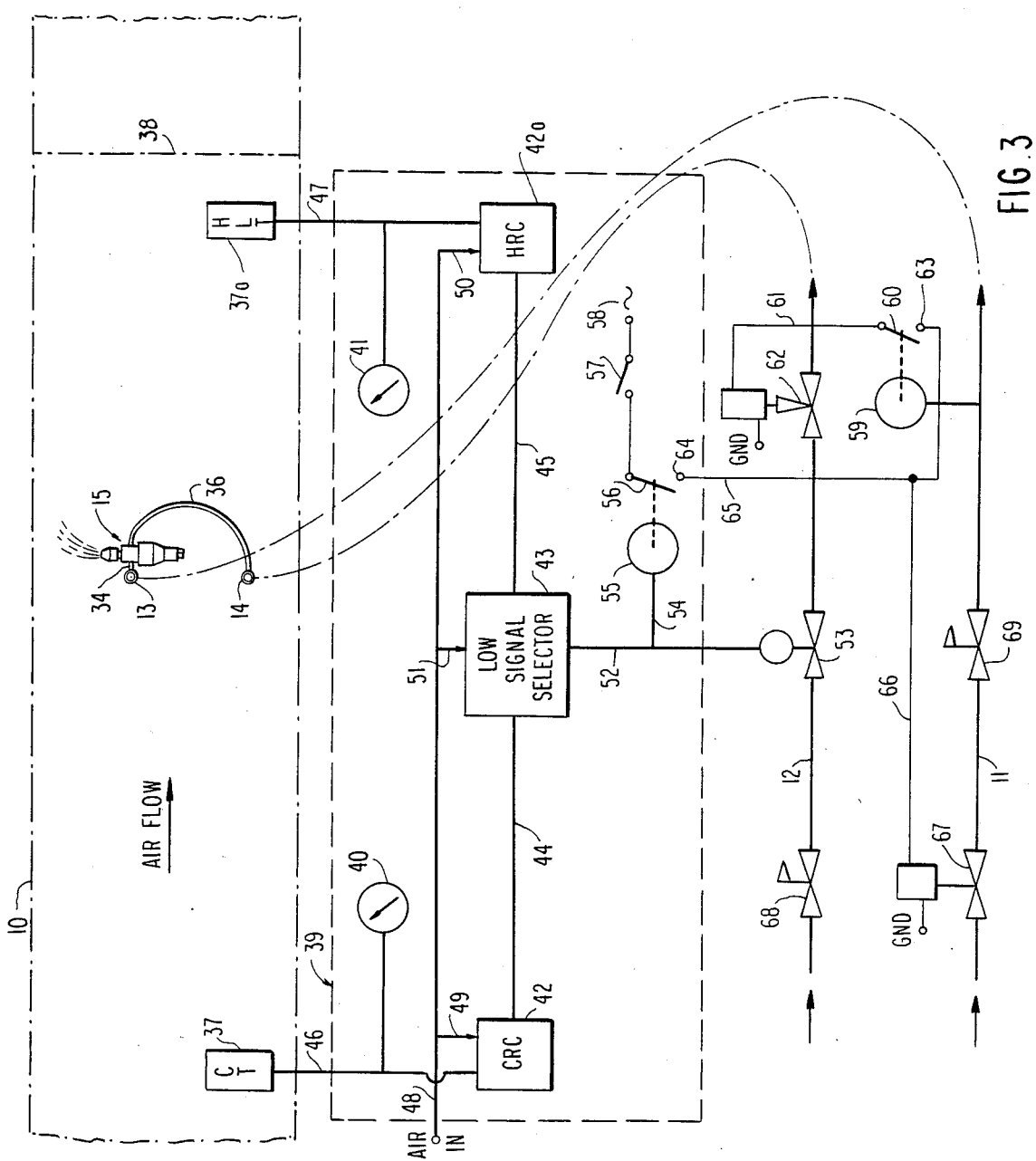
FIG. 3 is a pneumatic-electrical system schematic view of the invention.

Within the cabinet 39 is a low signal selector (comparator) 43 manufactured by Barber Coleman Company as No. AK-51642. The elements 42 and 42a and 43 are connected by pneumatic signal lines 44 and 45 within the cabinet 39. The elements 37 and 42 and 37a and 42a are connected by pneumatic signal lines 46 and 47. System control air, preferably at 20 psi, enters the system through a control air supply line 48 having connections with the elements 42, 42a and 43 as indicated at 49, 50 and 51. Another pneumatic signal line 52 for the signal selected by the low signal selector (comparator) 43 leads from the element 43 to the exterior of the cabinet 39 where it is connected to a modulating water valve 53 connected in the water supply line 12. Within the cabinet 39, the pneumatic signal line 52 is connected to a lateral pneumatic line 54, in turn connected to a pneumatic pressure-operated electric switch 55 having a contactor 56. A system on-off switch 57 on the face of cabinet 39 has one terminal connected with a 115 volt AC power source 58, as shown in FIG. 3.

A companion pneumatic pressure-operated electric switch 59 has a contactor 60 connected by a conductor 61 to the solenoid of a three-way water solenoid valve 62 connected in the water supply line 12 downstream from the modulating valve 53. The three-way valve 62 is manufactured by Automatic Switch Co. (ASCO), Florham Park, N.J. as No. 8316C24. The modulating water valve 53 is manufactured by Barber Coleman Company as No. VK-9263-303-4-1. The switch 59 is manufactured by Automatic Switch Co. as No. PA1-0A/RE10A11. The switch 59 is connected in air supply line 11 for operation by the pressure therein.

The terminals 63 and 64 of switch contactors 60 and 56 are interconnected by a conductor 65 having a branch conductor 66 leading to and connected with a two-way air solenoid valve 67 manufactured by Automatic Switch Co. as No. 8210D2. The two-way solenoid valve 67 is connected in the system air supply line 11, as shown. Also connected in the water supply line 12 upstream from the modulating valve 53 is a water pressure regulator 68 manufactured by Watts Regulator Co., Lawrence, Mass. as No. U5LP10-35. An air pressure regulator 69 is connected in the air supply line 11 downstream from the air solenoid valve 67. The regulator 69 is manufactured by Penn Air Company, York, Pa. as Valve Model No. 11-002-069. All of the enumerated control components in the system are standard commercial items.

Referring to FIG. 1, the air supply line 11 is preferably equipped with an upstream conventional manual shut-off valve 70, a pressure gage 71, and a filter 72 in the order and arrangement shown. None of these conventional elements plays any part in the functioning of the system controls depicted in FIG. 3. Similarly, the water supply line 12 contains a shut-off valve 74, a pressure gage 75, and another standard gage 76 which is used in conjunction with the air compressor gage in setting up the system to assure proper pressure at the spray heads 15.

A third gage 77 on the face of cabinet 39 displays the pressure signal going to the modulating water valve 53 which indicates the output of the system.

OPERATION

With the air flowing through the main duct 10 leading to various branch ducts of a building and with the in duct automatic humidification and evaporative cooling system components and their controls installed as described and with system air and water at the proper pressures being delivered to the lines 11 and 12 and control air at the proper pressure being in the line 48, the system operates as follows.

The main on-off switch 57 is closed to supply 115 volts AC to the system required to enable the pneumatic pressure-operated switches 55 and 59 to operate in connection with the solenoids of three-way and two-way valves 62 and 67 in the water and air supply lines 12 and 11.

The control (return air) humidity sensor/transmitter 37 sends a pressure signal via the pneumatic signal line 46 proportional to the relative humidity of the air which it is desired to control. This pneumatic signal will be displayed on the relative humidity gage 40. The same pneumatic signal is received by the return air receiver/controller 42 which in turn outputs a pneumatic signal through the line 44 which is proportional to the amount which the set point humidity setting selected on the receiver/controller 42 exceeds the actual relative humidity level being sensed by the sensor/transmitter 37. It must be understood that the return air receiver/controller 42 and high limit (supply air) receiver/controller 42a are preset in the system to enable the system to establish and maintain the desired himidity control with evaporative cooling.

Likewise, the high limit (supply air) humidity sensor/transmitter 37a sends a pneumatic pressure signal through the line 47 proportional to the relative humidity of the air which the system is required to keep within allowable limits. This pneumatic signal is displayed as relative humidity on the high limit gage 41. The same signal is received by the high limit (supply air) humidity receiver/controller 42a, which, in turn, outputs a pneumatic signal through the line 45 which is proportional to the amount which the set point selected on the high limit receiver/controller 42a exceeds the actual humidity level being sensed at the high limit humidity sensor/transmitter 37a.

The two pneumatic signal outputs from the return air and supply air receiver/controllers 42 and 42a are delivered to the low signal selector (comparator) 43. This device compares the two pneumatic signals and outputs the lower of the two signals through the line 52. This signal, through the line 52, when great enough, begins to open the modulating water valve 53. It also, through the lateral line 54, causes closing of the normally open contactor 56 of the pneumatic pressure-operated switch 55. The closure of this switch, through the completed electrical circuit, opens the two-way air solenoid valve 67, which then supplies air at a pressure governed by the regulator 69 to the air manifold 13 and its atomizing spray heads 15.

When the pressure of the air delivered to these spray heads exceeds a certain fixed value, the air supply pneumatic pressure-operated electric switch 59 closes its normally open contactor 60 to complete an electrical circuit to the solenoid of three-way solenoid valve 62 to open the latter in order to supply water at a pressure governed by the regulator 68 to the spray heads 15. This water first enters the water manifold 14 and then passes through the tubes 36 to the spray heads 15 which operate as previously described in detail in connection with FIG. 2 of the drawings. The volumetric flow rate of the water delivered to the spray heads 15 is determined by the position of the modulating water valve 53 which operates in response to the selected low pneumatic signal through the line 52.

The two solenoid valves 67 and 62 close simultaneously when electrical power is interrupted by the return of the switch contactor 56 to the normally open position shown in FIG. 3. Instantly, when the three-way solenoid valve 62 closes, water flow to the water manifold 14 is shut off and this manifold is de-pressurized and no residual water can bleed to or through the spray heads 15. However, when the two-way air solenoid valve 67 simultaneously closes, the compressed air remaining in the supply line 11 and air manifold 13 will blow out through the spray heads 15 to completely clear them of residual water.

It may now be seen that the previously stated capabilities of the invention are fully realized in the described operation of the system. If the water supply to the line 12 should fail, the spray heads 15 will discharge air only. Similarly, if supply water pressure is lost or reduced, the spray heads will merely sputter harmlessly. The spray heads will operate drip-free in a self-cleaning mode at the end of each "on" cycle terminated by the simultaneous closing of the two solenoid valves 67 and 62. The system always operates in a complete on-off mode to achieve the proper cleaning and purging of the spray heads 15, and the cycle of operation can be started or stopped by means of the system on-off switch 57.

It is to be understood that while the various components within the control cabinet 39, the humidity sensor/transmitters 37 and 37a, and the modulating water valve 53, and the like, are disclosed as pneumatic controls and as being pneumatically operated, from the schematic diagram of FIG. 3, it can be appreciated that comparable electronic and/or fluidic controls or electronically operated or fluidically operated components can be utilized in the system with the same results, and are considered to be within the scope of the invention.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. An in duct humidification and evaporative cooling system comprising in duct air and water manifold means including air/water spray heads, a first in duct relative humidity sensor/transmitter producing a signal proportional to the relative humidity of duct return air, a second in duct relative humidity sensor/transmitter producing a signal proportional to the relative humidity of duct supply air, first and second preset external receiver-controllers receiving the two signals produced by said first and second relative humidity sensor/transmitters, an external low signal comparator-selector receiving separate output signals from the first and second preset receiver-controllers which are proportional to the amounts which the set points of the two receiver-controllers exceed the actual relative humidity levels of the duct return and supply air being sensed by the first and second in duct humidity sensor/transmitters, pressurized air and water supply lines connected with said air and water manifold means, a water modulating valve connected in said pressurized water supply line and receiving the selected low signal from said low signal comparator-selector, an on-off valve connected in each of said pressurized air and water supply lines, and means responding to the selected low signal from said low signal comparator-selector and being connected with and operable to open and close said on-off valves of the pressurized air and water supply lines.

2. An in duct humidification and evaporative cooling system as defined in claim 1, and at least said selected low signal from the low signal comparator-selector comprising a pneumatic pressure signal, said on-off valves in said pressurized air and water supply lines comprising solenoid valves, and said means responding to said selected low signal including a pneumatic pressure-operated electrical switch means connected with the solenoids of said on-off valves.

3. An in duct humidification and evaporative cooling system as defined in claim 2, and a pneumatic signal delivery line connected between said low signal comparator-selector and said water modulating valve, said last-named means comprising a first pneumatic pressure-operated electrical switch connected with said pneumatic signal delivery line, a second pneumatic pressure-operated electrical switch connected with the pressurized air supply line, and electric power conductor means interconnecting said electrical switches and connecting the first switch with the solenoid of the on-off valve in the pressurized air supply line and connecting the second switch with the solenoid of the on-off valve in the pressurized water supply line.

4. An in duct humidification and evaporative cooling system as defined in claim 3, and said first and second electrical switches having normally open contactors connected in electrical series, and the contactor of said first switch connected to close in response to the selected low pneumatic signal acting on said first switch.

5. An in duct humidification and evaporative cooling system as defined in claim 4, and the on-off solenoid valve in the pressurized air supply line comprising a two-way valve, and the on-off solenoid valve in the pressurized water supply line comprising a three-way valve.

6. An in duct humidification and evaporative cooling system as defined in claim 12, and said control signal transmission means comprising a control air supply line, the signals produced by the first and second in duct relative humidity sensor/transmitters, by the first and second preset external receiver-controllers and by the external low signal comparator-selector all comprising pneumatic pressure signals, and said means responding to the selected low signal from said low signal comparator-selector being a pneumatic pressure signal responsive means.

7. An in duct humidification and evaporative cooling system as defined in claim 6, and said on-off valves in the pressurized air and water supply lines comprising solenoid valves, and the last-named means including a pneumatic pressure-operated electrical switch operatively connected with the solenoids of said on-off valves to close the same when said selected low signal opens said pneumatic pressure-operated electrical switch.

8. An in duct humidification and evaporative cooling system as defined in claim 1, and said in duct air and water manifold means including air/water spray heads extending substantially across the longitudinal axis of an air duct on which the system is installed, and the axes of said air/water spray heads extending substantially at right angles to the air and water manifold means.

9. An in duct humidification and evaporative cooling system as defined in claim 8, and the air and water manifold means comprising separate spaced air and water manifolds, said air/water spray heads being mounted on the air manifold and receiving pressurized air therefrom, and water supply tubes connected between the water manifold and water inlets of said air-/water spray heads.

10. An in duct humidification and evaporative cooling system as defined in claim 1, and a cabinet external to an air duct on which the system is mounted containing said first and second preset external receiver-controllers and said external low signal comparator-selector.

11. A humidification and evaporative cooling system for a building having a main air duct leading to a number of branch air ducts, the system comprising a first relative humidity sensor/transmitter mounted within the main air duct and producing a pneumatic pressure signal proportional to the relative humidity of the return air in the duct, a second relative humidity sensor/transmitter mounted within the main air duct substantially downstream from the first relative humidity sensor/transmitter and near a first obstruction in the main air duct and producing a pneumatic pressure signal proportional to the relative humidity of the supply air in the main air duct, first and second preset receiver-controllers externally of the main air duct and connected with and receiving pneumatic pressure signals of different magnitudes produced by the first and second relative humidity sensor/transmitters and outputting pneumatic pressure signals of different magnitudes, a low pneumatic pressure signal comparator-selector receiving the two signals from said first and second receiver-controllers and outputting the pneumatic pressure signal having the lower magnitude delivered to said comparator-selector, pressurized air and water supply lines arranged externally of the main air duct, air and water manifolds arranged within the main air duct between the first and second relative humidity sensor/transmitters and extending across the longitudinal axis of the main air duct and being connected respectively with said pressurized air and water supply lines, air/water spray heads on the air manifold and having air inlets in communication with the air manifold, water delivery tubes connected between the water manifold and water inlets of the air/water spray heads, a water modulating valve connected in said pressurized water supply line and receiving the lower pneumatic pressure signal from said low signal comparator-selector, an on-off solenoid valve connected in the pressurized air supply line, another on-off solenoid valve connected in the pressurized water supply line, pneumatic pressure signal responsive electric switching means receiving and responding to said lower pneumatic pressure signal from said comparator-selector and having a connection with the pressurized air supply line and being operable to open and to simultaneously close said on-off valves in the pressurized air and water supply lines, and control air supply means connected with the first and second preset receiver-controllers and said low signal comparator-selector.

12. An in duct humidification and evaporative cooling system as defined in claim 1, including a control signal transmission means connected with said first and second preset external receiver-controllers and external low signal comparator-selector.

* * * * *